United States Patent [19]

Sekiguchi

[11] Patent Number: 4,630,137
[45] Date of Patent: Dec. 16, 1986

[54] TAPE TIMER APPARATUS FOR VIDEO TAPE RECORDER

[75] Inventor: Toru Sekiguchi, Tokyo, Japan

[73] Assignee: NEC Corporation, Japan

[21] Appl. No.: 544,428

[22] Filed: Oct. 21, 1983

[30] Foreign Application Priority Data

Oct. 22, 1982 [JP] Japan ................................ 57-185626

[51] Int. Cl.$^4$ ............................................. G11B 27/10
[52] U.S. Cl. ....................................... 360/13; 360/137;
360/71; 360/72.1; 369/19
[58] Field of Search ....................... 360/13, 14.1, 14.2,
360/14.3, 137, 71, 72.1, 72.2, 90, 10.1, 10.3;
369/19, 30

[56] References Cited

U.S. PATENT DOCUMENTS

| | | | |
|---|---|---|---|
| 3,939,491 | 2/1976 | Shigeta | 360/85 X |
| 4,140,896 | 2/1979 | Robertson | 360/137 X |
| 4,151,566 | 4/1979 | Ohrman | 360/72.1 |
| 4,363,048 | 12/1982 | Tanaka et al. | 360/14.2 X |
| 4,463,391 | 7/1984 | Takano et al. | 360/14.2 |

Primary Examiner—Robert L. Richardson
Attorney, Agent, or Firm—Ostrolenk, Faber, Gerb & Soffen

[57] ABSTRACT

A tape timer apparatus is disclosed. Apparatus is provided for producing frame pulses indicating a frame period in a running tape and for producing a tape direction signal. An up/down counter counts up or down, as determined by the tape direction signal, in response to the frame pulses. A detecting circuit generates a detection signal indicating whether the frequency of the frame pulse has exceeded a predetermined frequency. A circuit is also provided for dividing the frame pulses by a predetermined number and generating a single frequency divided pulse each time the predetermined number of frame pulses is generated. A selection circuit selects, in accordance with the detection circuit, either the frame pulse or the frequency divided pulse. A microcomputer receives the pulse from the selecting means as an interruption demand pulse and calculates the tape time on the basis of the value counted by the up/down counter.

3 Claims, 4 Drawing Figures

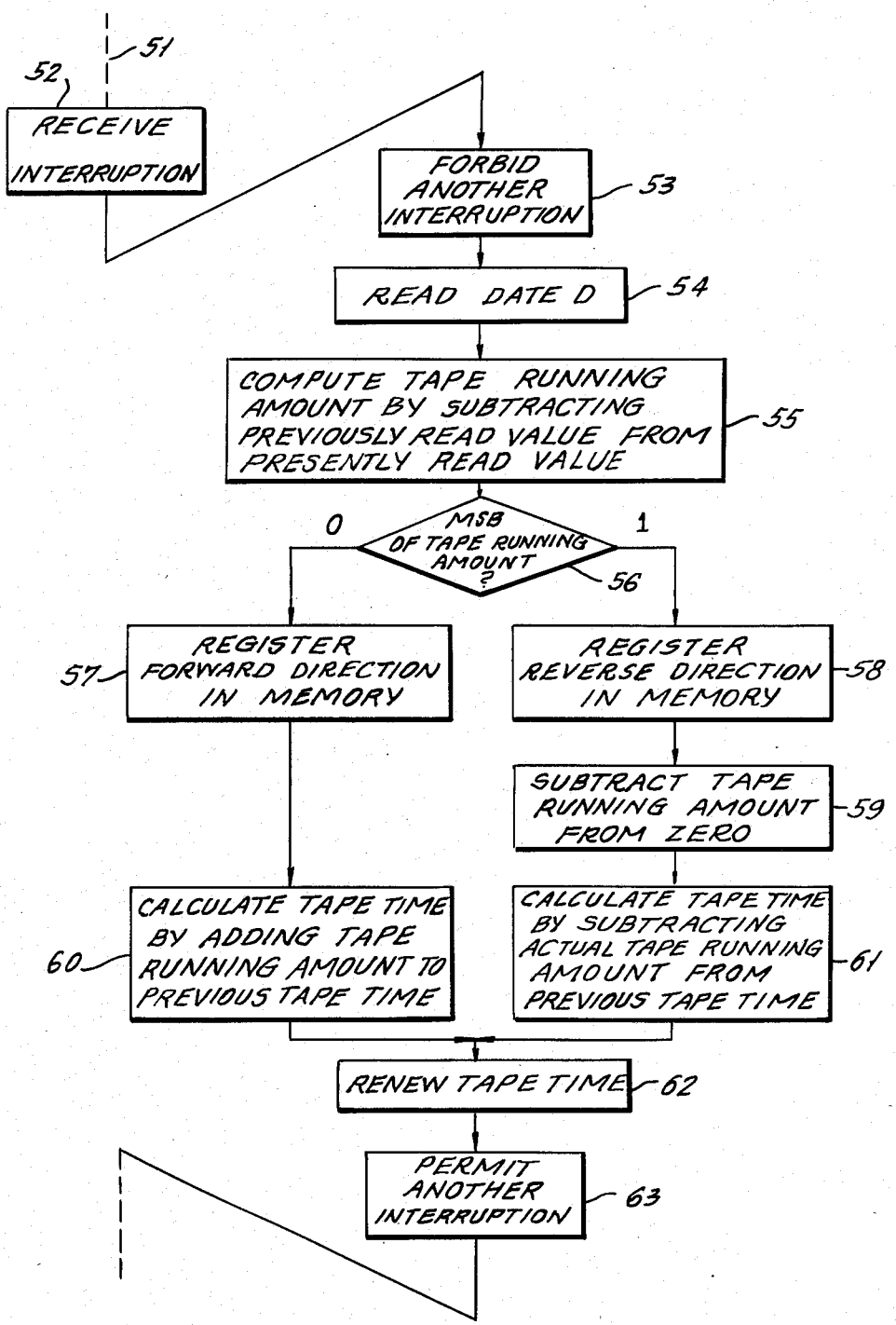

TAPE TIMER APPARATUS FOR VIDEO TAPE RECORDER

BACKGROUND OF THE INVENTION

The present invention relates to a video tape recorder and, more particularly to a tape timer apparatus used in the video tape recorder.

In a video tape recorder (VTR), a tape timer apparatus counts a tape time which indicates the amount the tape has run, and, therefore, the position of the tape being recorded or reproduced at this moment. In a prior art tape timer apparatus, such tape time is counted by an up/down counter assembly in response to a frame pulse which is used as a clock signal and a tape direction signal both delivered from the VTR. However, in a VTR applied for broadcasting use, the period indicated by a tape timer apparatus should range from a single frame period up to a ten hour period. In order to realize such a long period, the tape timer apparatus must use many up/down counters.

In a theoretical tape timer apparatus to be described herein, a microcomputer is used to count a tape time in response to the of receipt frame pulses and a tape direction signal. More specifically, the frame pulses are applied as an interruption demand signal to the microcomputer so that the microcomputer performs an addition or subtraction operation in accordance with the tape direction signal every time a frame pulse is received. This interruption step is conducted on the basis of the minimum period (frame period), and as the tape speed is increased during a fast forward or rewinding operation, the interval between interruption demand signals is shortened correspondingly. For instance, when the tape running speed is increased 50 times as high as normal speed, the interruption demand signal is generated at a time interval of 660 $\mu$s. If the microcomputer does not have sufficient capacity to cope with such a high speed interruption demand signal, it is impossible to process all of interruption demands, resulting in an error in the counted data. In addition, a microcomputer employed in a current VTR is also used for performing operation control thereof other than counting the tape time. Therefore, when the tape speed becomes high, the operation control other than the tape time counting is not performed due to the high frequency interruption demands. To prevent this problem, it is necessary to use a microcomputer having a high processing speed exclusively for counting the tape time.

The above described problem would be overcome if the counting is made not in response to each frame pulse but in response to every fourth frame pulse. This countermeasure, however, makes it difficult to conduct a detailed edition on the frame unit in the tape edition.

SUMMARY OF THE INVENTION

Accordingly, an object of the present invention is to provide a tape timer apparatus which can count a tape time even when a tape speed in a VTR is increased during a fast forward or rewinding operation.

Another object of the invention is to provide a tape timer apparatus which can exactly count a tape time using a microcomputer having a low processing speed.

Still another object of the invention is to provide a tape timer apparatus employing a microcomputer adapted to perform not only counting of a tape time but also other operation controls, wherein any unfavourable effect on the other operation control can be eliminated even when the tape running speed is increased.

To these ends, according to an aspect of the invention, there is provided a tape timer apparatus comprising: means for producing frame pulses indicating a frame period in a running tape; means for producing a tape direction signal; an up/down counter adapted to count up or down, as determined by the tape direction signal, in response to each of the frame pulses; a detecting mans adapted to generate a detection signal indicating whether the frequency of the frame pulse has exceeded a predetermined frequency; means for dividing the frame pulses by a predetermined number and for generating a single frequency divided pulse each time said predetermined number of frame pulses is generated; selecting means adapted to select, in accordance with the detection signal either the frame pulse or the frequency divided pulse; and a microcomputer receiving the pulse from the selecting means as an interruption demand pulse and calculating a tape time on the basis of the value counted by the up/down counter.

BRIEF DESCRIPTION OF THE DRAWINGS

FIG. 4 is a flow chart of the tape time counting process performed by a microcomputer incorporated in the embodiment shown in FIG. 4.

DESCRIPTION OF THE PREFERRED EMBODIMENT

Figure 1:
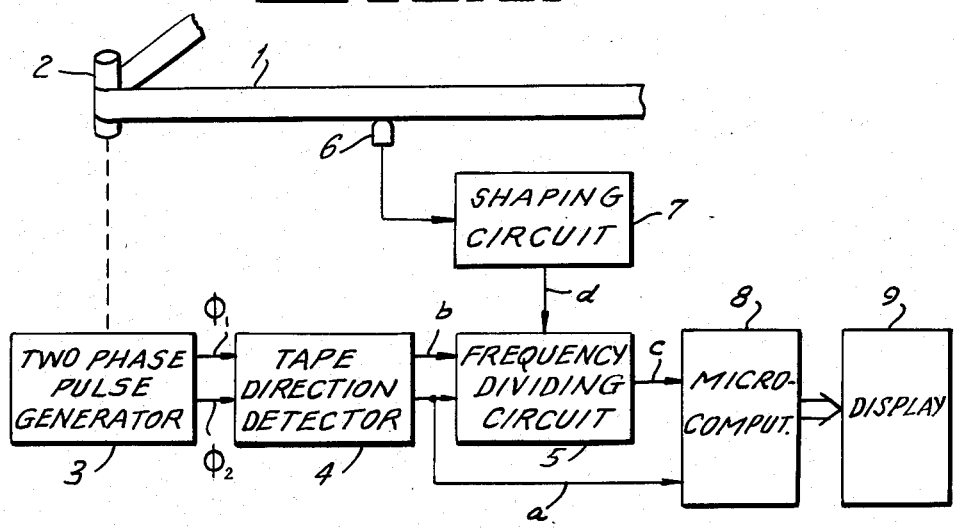
FIG. 1 is a block diagram of a theoretical tape timer apparatus incorporating a microcomputer.
Figure 2:
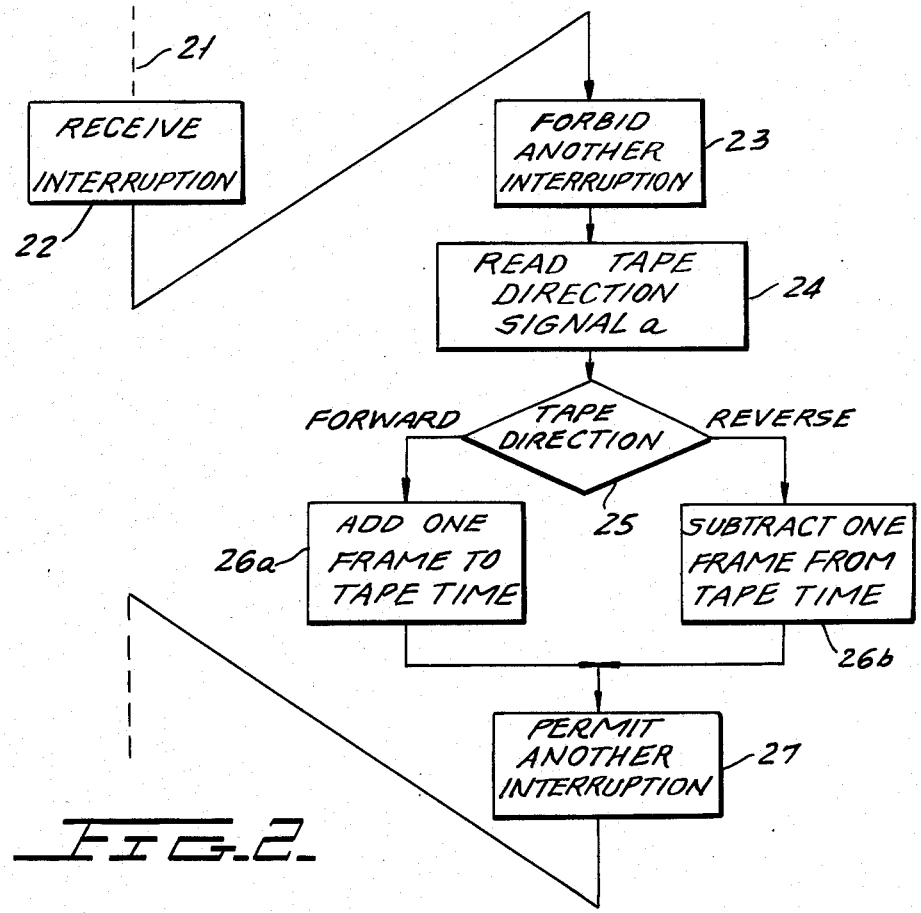
FIG. 2 is a flow chart of tape counting process performed by the microcomputer in the theoretical tape timer apparatus shown in FIG. 1.
Figure 3:
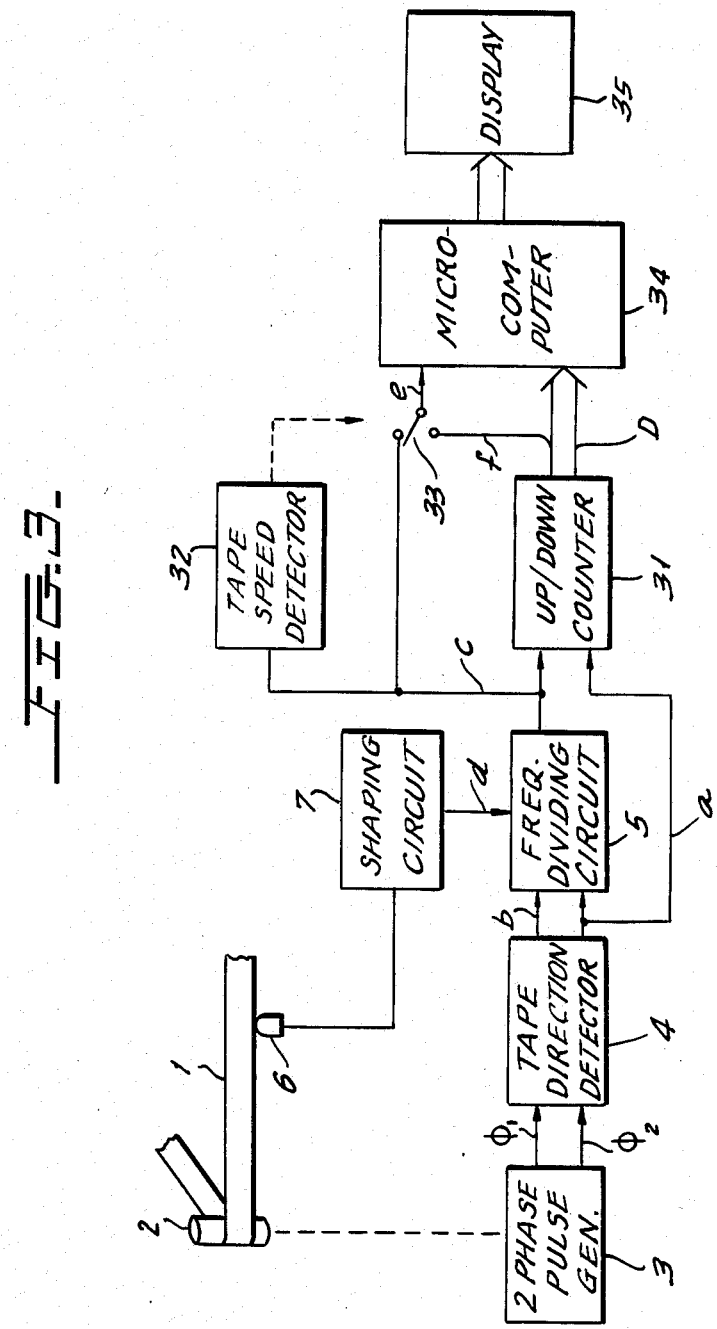
FIG. 3 is a block diagram of an embodiment of the presently claimed invention.

The construction and operation of a theoretical tape timer apparatus (FIGS. 1-2) will be explained first in order to facilitate the understanding of the presently claimed invention (FIGS. 3-4). Referring to FIG. 1, a magnetic tape 1 loaded on a VTR is wound about 120° around a timer roller 2 so that the running of the magnetic tape 1 is converted into the rotation of the timer roller 2. A two-phase pulse generator 3 is adapted to produce two pulses $\phi_1$ and $\phi_2$ having different phases with respect to each other and a frequency proportional to the rotation of the timer roller 2. Particularly, when the magnetic tape runs forward, the phase of the pulse $\phi_1$ is 90° ahead of the phase of the pulse $\phi_2$, while, when the magnetic tape 1 runs reversely, the phase of the pulse $\phi_1$ lags 90° from the phase of the pulse $\phi_2$. The pulses $\phi_1$ and $\phi_2$ have a frequency of 1920 p.p.s. when the tape runs at the normal speed. The pulses $\phi_1$ and $\phi_2$ delivered from the pulse generator 3 are supplied to a direction detector 4 which is adapted to produce a direction signal a as a function of the phase relationship between the pulses $\phi_1$ and $\phi_2$. For example, the direction signal a assumes a low level "L" and a high level "H" when the magnetic tape 1 runs in the forward and reverse directions, respectively.

The direction detector 4 also shifts the timing of the pulse $\phi_1$ so as to deliver it as a clock pulse b to a dividing circuit 5. The dividing circuit 5 divides the clock pulse b by a factor of 64 to produce a frame pulse. On the other hand, a control track pulse (CTL) having a frame cycle period recorded in a control track of the magnetic tape 1 is reproduced by a reproduction head 6. The reproduced signal is shaped into a compensation signal d by a shaping circuit 7 and then supplied to the dividing circuit 5. In the dividing circuit 5, the compensation signal d delivered from the shaping circuit 7 is used for eliminating an error contained in the pulse $\phi_1$ due to slippage between the magnetic tape 1 and the timer roller 2 or lack of mechanical precision in the timer roller 2. As a result, the frame pulse c is delivered from the dividing circuit 5 and supplied to a microcomputer 8 as an interruption demand signal. As the tape runs, the interruption demand signal is applied to the microcomputer 8 so that interruption processing is made by a software program in accordance with the process shown in FIG. 2.

Referring now to FIG. 2, when the interruption demand signal (frame pulse c) is delivered during a processing of ordinary processing routine 21 (e.g., the main program), the interruption demand signal is received in the step 22 and the process jumps to the interruption processing routine starting with a step 23. More specifically, in the step 23, the initiation of a new interruption routine in response to a newly incoming interruption demand signal is forbidden, and the tape running direction signal a is read by the microcomputer 8 in a step 24. In a next step 25, the tape running direction is discriminated and, if the tape is running in the forward direction, one frame is added to data previously counted in a step 26a, whereas, when the tape is running in the reverse direction, one frame is subtracted from the previously counted data in a step 26b. Then, in a step 27, an operation is made to permit another subsequent interruption and then the process is returned to the step 21 (i.e., to the main program). The data counted by the microcomputer 8 is delivered to a display device 9 on which the tape time is displayed.

As stated before, this theoretical tape timer apparatus encounters the following problems. Namely, when the tape speed is increased, the interval between successive interruption demand signals is shortened so that the microcomputer fails to count the tape time correctly unless it has a sufficiently high procesing speed. If the microcomputer also carries out operation control functions for the VTR (e.g., stopping of the tape in accordance with a preset address, control of the operating modes of the VTR and so forth) in addition to the counting of the tape time, such operation control functions may fail due to too frequent interruption demands.

An embodiment of the present invention will be described hereinafter with reference to FIG. 3. The process for forming the frame pulse c and the direction signal a is identical to that described above in connection with FIG. 1. According to the invention, an 8-bit up/down counter 31 is provided to count up or down in accordance with the direction signal a using the frame pulse c as the clock signal. More specifically, the up/down counter 31 counts up if the tape is running in the forward direction and counts down if the tape is running in the reverse direction. A speed detector 32, which receives the frame pulses c, is adapted to switchover a selector 33 when the tape speed has exceeded a predetermined speed. The selector 33 is adapted to selectively output the frame pulse c or a signal f which is the second bit from the least signficant bit of the 8-bit counted data D delivered from the counter 31. Therefore, one signal f is produced for every four frame signals. The selector 33 selects the signal f when the tape speed is higher than the predetermined speed and selects the output c when the tape speed is equal to or lower than the predetermined tape speed. The selected output is used as an interruption demand signal e to a microcomputer 34. In the described embodiment, the predetermined tape speed applied in the speed detector 32 is 3.5 times as high as the normal tape speed.

The 8-bit up/down counter 31 is adapted to output data indicating values from "0" up to "255" in terms of decimal system. The output of the counter 31 also can be expressed by "00" to "FF" by hexadecimal system. In this embodiment, the bit number of the counter 31, i.e., the range of the counted data, is so selected that, when the tape speed reaches the maximum level, the amount counted between successive signals f produced for every four frames is less than "80" in terms of the hexadecimal system, i.e., less than "128" in terms of decimal system, or less than a half of the full range which can be presented by the up/down counter 31. The output data D delivered from the up/down counter 31 is sent to a data bus of the microcomputer 34. In the following description, the data expressed in terms of hexadecimal system is represented with a suffix H as, for example, "00"H, "80"H and so forth.

According to the invention, the tape time is counted by means of a software program in response to an interruption demand signal e and as a function. If the counted data D. An explanation will be made hereinafter as to the processing by the software, with specific reference to FIG. 4. Referring to this Figure, an interruption demand is given to the microcomputer 34 when an interruption demand signal e is received during processing of the ordinary processing routine 51. The interruption demand is received in a step 52 so that the processing of the ordinary processing routine 51 (main program) is temporarily forbidden and the process skips to the interruption processing routine which starts with a step 53. In this step, the initiation of a new interruption routine in response to the receipt of a new interrupter demand signal e is forbidden. The program then proceeds to step 54 wherein the counted data D is read as a "presently read counted value". Then, a "tape running amount" is computed by subtracting a "previously read counted value", which is read in the preceding interruption routine, from the "presently read counted value" in a step 55. In the microcomputer 34, the tape running direction and an actual tape running amount are determined from the result of the step 55 as described hereinafter.

The counted data D represents only the output of the up/down counter 31. It is, therefore, impossible to know whether the tape is running in the forward direction or in the reverse direction, solely from the "running amount" as the result in the step 55. For instance, assume here that the "previously read counted value" is "10"H, while the "presently read. counted value" is "80"H. In this case, the "tape running amount" as the result in the step 55 is expressed by "70"H. However, there is no means to know whether the tape has run by amount "70"H in the forward direction or by amount "90"H in the reverse direction. Therefore, in this embodiment, the state of the most significant bit (MSB) of the 8-bit data representing the "tape running amount" is checked for discriminating the tape running direction in a step 56. More specifically, it is determined that the tape is running in the forward direction when the state of the MSB is "0" and it is deterined that the tape is running in the reverse direction when the MSB state is "1". Because the counting range of the counter 31 is determined as the counted range during the interruption demand signals is always less than the half range of it. In this case, the actual running amount is expressed in the subordinate seven bits. In the forementioned case, since the data is expressed by "70"H, the state of MSB is "0" so that it is understood that the tape has run "70"H in the forward direction. For instance, when the "previously read counted value" is "30"H while the "presently read counted value" is "F0"H, the "tape running amount" as the result in the step 55 is given to be "C0"H. In this case, the MSB of the 8-bit data expressing "C0"H is "1", so that it is understood that the tape is running in the reverse direction. Furthermore, the actual running amount "40"H is calculated. This process is performed by steps 56 to 59 shown in FIG. 4. Referring to FIG. 4, if the MSB state of data representing the "tape running amount" is "0" in the step 56, the process goes to the step 57 where, the forward tape running direction is registered. Then, the "tape running amount" is added a previous tape time data memorized in the microcomputer 34 in a step 60 and the result of addition indicates the present tape time. The previous tape time is renewed by the present tape time in a step 62 for next tape time counting.

In contrast, if the MSB state of the data representing the "tape running amount" is "1" in the step 56, the process proceeds to the step 58 where the reverse tape running direction is registered. In the step 59, in order to calculate the actual running amount, the "tape running amount" computed in the step 55 is subtracted from "00"H. Because, the actual running amount is expressed by the subordinate seven bits in the subtracted result of 8-bits. Then, in a step 61, the actual running amount is subtracted from the previous tape time value and the subtracted result indicates the present tape time. Then, the previous tape time is renewed by the present tape time (i.e., the present tape time is stored as the previous tape time) for the next tape time counting in the step 62. As described heretofore, one cycle of interruption processing for tape time counting is thus completed and the mode is changed in a next step 63 into the mode for receiving a newly incoming interruption demand signal, and the process is returned to the normal processing routine 51 (the main program). In the described embodiment, an 8-bit counter is used as the up/down counter 31. This, however, is not exclusive and the up/down counter 31 may be constituted by a counter having any bit number other than eight. It is to be understood also that, although in the described embodiment the interruption demand signal e is switched when the tape speed exceeds 3.5 times the normal tape speed, the same effect is obtainable even if the change of the interruption demand signal e is made at another different speed.

As will be understood from the foregoing description, the invention provides a tape timer apparatus by incorporating an up/down counter having relative small counting capacity. Using the data counted by this up/down counter, even though the frequency of interruption demand is decreased, when the tape running speed exceeds the predetermined speed, it is possible to obtain the same effect as that obtained when the software process is conducted for each frame pulse. This in turn affords the realization of a tape timer without requiring any limitation of the maximum tape running speed, even with a system incorporating a microcomputer having a comparatively low processing speed. In addition, the microcomputer is conveniently allowed to perform other processes for the operation control within the free time indemnified by the present invention.

What is claimed is:

1. A tape timer apparatus for producing a tape time corresponding to a running tape amount, said apparatus being incorporated in a video tape recorder, comprising:
    means responsive to running of a tape located in said video tape recorder for producing frame pulses, the interval between two said frame pulses corresponding to a frame period in a running tape;
    means responsive to the running of said tape for producing a tape direction signal indicating the direction said tape is running;
    an up/down counter for counting up or down, as determined by said tape direction signal, in response to each said frame pulse to produce counted data;
    means for producing a selection signal having a first state when the frequency of said frame pulse is below a predetermined frequency and having a second state when the frequency of said frame pulse exceeds said predetermined frequency;
    means for producing a single frequency divided pulse each time a plurality of said frame pulses are produced;
    means responsive to said selection signal for selecting one of said frame pulses and said frequency divided pulse and delivering said selected pulse as an interruption demand; and
    means responsive to said counted data and said interruption demand pulse for computing said tape time.

2. The tape timer apparatus as claimed in claim 1, in which said means for generating said frequency divided pulse is a counter having a plurality of output bits, the signal on one of said bits representing said frequency divided pulse.

3. The tape timer apparatus as claimed in claim 1, in which said computing means is characterized by including the following processing steps:
    receiving said interruption demand pulse;
    receiving said counted data delivered from said up/down counter;
    subtracting a previously received counted data stored in said computing means from the receiving counted data;
    calculating the amount said tape has run in between two said interruption demand pulses by checking the subtracted data produced by said subtracting step; and
    calculating said tape time by adding said tape running amount to a previously calculated tape running amount stored in said computing time.

* * * * *